(12) United States Patent
Osterhage (10) Patent No.: US 10,113,938 B2
(45) Date of Patent: Oct. 30, 2018

(54) TEST APPARATUS FOR SIMULATED TESTING OF A MOTOR VEHICLE ON AT LEAST ONE TEST BENCH, TEST BENCH WITH THE TEST APPARATUS AND METHOD FOR SIMULATED TESTING OF A MOTOR VEHICLE ON AT LEAST ONE TEST BENCH WITH THE TEST APPARATUS

(71) Applicant: GM GLOBAL TECHNOLOGY OPERATIONS LLC, Detroit, MI (US)

(72) Inventor: Klaus Osterhage, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 15/184,327

(22) Filed: Jun. 16, 2016

(65) Prior Publication Data

US 2016/0370257 A1 Dec. 22, 2016

(30) Foreign Application Priority Data

Jun. 16, 2015 (DE) .................. 10 2015 007 672

(51) Int. Cl.
*G01M 17/007* (2006.01)
(52) U.S. Cl.
CPC .................. *G01M 17/007* (2013.01)
(58) Field of Classification Search
CPC .................................................. G01M 17/00
See application file for complete search history.

(56) References Cited

U.S. PATENT DOCUMENTS

| | | | |
|---|---|---|---|
| 1,453,954 A | | 5/1923 | Scholtes |
| 2,148,504 A | * | 2/1939 | Richter .................. B60G 21/00 267/187 |
| 3,459,037 A | * | 8/1969 | Holzman .............. G01M 17/04 384/259 |
| 3,575,046 A | * | 4/1971 | Shattles ................ G01L 5/0033 73/761 |
| 3,850,419 A | * | 11/1974 | Craig ........................ B66F 5/00 254/134 |
| 4,689,998 A | * | 9/1987 | Jackson ............ G01M 17/0078 73/669 |
| 4,700,798 A | * | 10/1987 | Johansson .............. B62D 61/12 180/198 |

(Continued)

FOREIGN PATENT DOCUMENTS

| | | |
|---|---|---|
| EP | 2045206 A1 | 4/2009 |
| GB | 2494712 A | 3/2013 |

OTHER PUBLICATIONS

German Patent Office, German Search Report for German Application No. 102015007672.8, dated Mar. 20, 2016.

*Primary Examiner* — Harshad R Patel
*Assistant Examiner* — Tran M Tran
(74) *Attorney, Agent, or Firm* — Lorenz & Kopf, LLP (57) ABSTRACT

A test apparatus for simulated testing of a motor vehicle on at least one test bench includes a frame structure in the form of a functional model of the motor vehicle structure. The frame structure includes a front frame section with a functional front axle model, a rear frame section with a functional rear axle model and a middle frame section arranged between the front frame section and the rear section. The length of frame structure is variably adjustable.

14 Claims, 4 Drawing Sheets

(56) References Cited

U.S. PATENT DOCUMENTS

| | | | | |
|---|---|---|---|---|
| 4,869,539 A * | 9/1989 | Cassese | ............... | B60G 99/00 |
| | | | | 280/781 |
| 5,335,932 A * | 8/1994 | Pierce | ............... | B60G 11/27 |
| | | | | 280/124.116 |
| 5,489,114 A * | 2/1996 | Ward | ............... | B60B 35/1054 |
| | | | | 180/209 |
| 5,560,444 A * | 10/1996 | Tiedge | ............... | B60P 3/34 |
| | | | | 180/209 |
| 5,610,330 A * | 3/1997 | Fricke | ............... | G01M 7/022 |
| | | | | 73/146 |
| 5,641,904 A * | 6/1997 | Kopp | ............... | G01M 1/22 |
| | | | | 73/457 |
| 5,777,243 A | 7/1998 | Kewish | | |
| 6,077,078 A * | 6/2000 | Alet | ............... | F16M 11/046 |
| | | | | 434/29 |
| 6,247,348 B1 | 6/2001 | Yamakado et al. | | |
| 6,761,077 B1 * | 7/2004 | Zhu | ............... | G01M 7/06 |
| | | | | 73/865.6 |
| 7,921,713 B2 * | 4/2011 | Czoka | ............... | G01M 17/04 |
| | | | | 73/11.04 |
| 8,112,178 B2 * | 2/2012 | Librojo Garing | ... | G05D 1/0246 |
| | | | | 180/167 |
| 8,290,661 B2 * | 10/2012 | Han | ............... | G01R 31/007 |
| | | | | 701/32.8 |
| 8,322,728 B2 * | 12/2012 | Hirao | ............... | B60G 17/015 |
| | | | | 280/5.506 |
| 8,939,032 B2 * | 1/2015 | Bruce | ............... | G01M 5/005 |
| | | | | 73/784 |
| 9,086,332 B2 * | 7/2015 | Ito | ............... | G01M 17/0078 |
| 9,212,973 B2 * | 12/2015 | Weber | ............... | G01M 17/0078 |
| 9,290,184 B1 * | 3/2016 | Diel | ............... | B60C 23/0474 |
| 9,442,043 B2 * | 9/2016 | Tagami | ............... | G01M 17/007 |
| 9,442,044 B2 * | 9/2016 | Tagami | ............... | G01M 17/007 |
| 9,725,060 B1 * | 8/2017 | Daniel | ............... | B62D 21/15 |
| 9,759,635 B2 * | 9/2017 | Park | ............... | G01M 17/007 |
| 9,792,830 B2 * | 10/2017 | Lin | ............... | G09B 9/04 |
| 2007/0260438 A1 | 11/2007 | Langer | | |
| 2015/0332522 A1 * | 11/2015 | Komada | ............... | G01M 17/007 |
| | | | | 701/29.1 |
| 2016/0363508 A1 * | 12/2016 | Osterhage | ......... | G01M 13/025 |
| 2017/0315023 A1 * | 11/2017 | Decobert | ............ | G01M 17/08 |

* cited by examiner

TEST APPARATUS FOR SIMULATED TESTING OF A MOTOR VEHICLE ON AT LEAST ONE TEST BENCH, TEST BENCH WITH THE TEST APPARATUS AND METHOD FOR SIMULATED TESTING OF A MOTOR VEHICLE ON AT LEAST ONE TEST BENCH WITH THE TEST APPARATUS

CROSS-REFERENCE TO RELATED APPLICATION

This application claims priority to German Patent Application No. 102015007672.8, filed Jun. 16, 2015, which is incorporated herein by reference in its entirety.

TECHNICAL FIELD

The present disclosure pertains to a test apparatus for simulated testing of a motor vehicle on at least one test bench, and further relates to a method for simulated testing of a motor vehicle on at least one test bench.

BACKGROUND

When motor vehicles are manufactured, they are often tested on test benches to evaluate their driving behavior, dynamics and response to the forces to which they are exposed. It is already known to use simulation models of motor vehicles for this purpose so that prototype vehicles do not have to be tested on the test bench, particularly in an early development phase of the motor vehicle.

US 2007/026 0438 A1 describes a motor vehicle test apparatus for testing motor vehicles on a test bench. The motor vehicle test apparatus includes an integrated simulation model, with which a motor vehicle is simulated. The simulation model includes components of the motor vehicle that are to be tested. When the simulation model is tested on the test bench, effects on the components of the motor vehicle can be determined.

SUMMARY

The present disclosure provides a functionally improved test apparatus, which can be implemented in a wide range of applications for simulated testing of a motor vehicle on at least one test bench. In particular, a test apparatus is provided for simulated testing of a motor vehicle, particularly a motor car, on at least one test bench. The motor vehicle has a motor vehicle structure, for example a vehicle body, and further includes at least one of a front axle, a rear axle, an exhaust system and a drive and/or transmission unit. The motor vehicle is preferably associated with a B (subcompact) and/or C (compact) motor vehicle segment, and is particularly designed as a motorcar of the small and/or compact class.

The test apparatus is preferably constructed as a functional model of the motor vehicle. In particular, the test apparatus is configured for simulated testing of a motor vehicle. The functional model preferably simulates the motor vehicle, particularly in a test state, specifically during testing on the at least one test bench.

In detail, the test apparatus replaces a fully equipped measurement vehicle, whereas the at least one test bench, which is in the form of a load test bench for example, simulates characteristic measurement distances and/or road profiles. This makes it possible to detect forces that act on the motor vehicle while it is being driven. For example, a load test of the test apparatus can be carried out on the load test bench, by means of which it is possible to determine the structural loads on the test apparatus. In particular, the detected structural loads that are exerted on the test apparatus via the load test bench may be transferred to the motor vehicle.

Alternatively or additionally, the at least one test bench is in the form of a measuring test bench, with which the full range of the motor vehicle kinematics can be measured. Preferably, it is the test apparatus instead of the motor vehicle that is measurable on the measuring test bench. The results of measurement can be transferred to the motor vehicle. This is advantageous because the test apparatus is much easier to handle on the at least one test bench than the motor vehicle itself, particularly if the vehicle is fully equipped.

Since the test apparatus constitutes a functional model of the motor vehicle, it then becomes possible to test the motor vehicle at a very early stage of development on the basis of the test apparatus. This enables important conclusions to be drawn about the dynamics and driving behavior of the motor vehicle that is to be produced. It is of considerable advantage that the test apparatus is able to reproduce a wide range of motor vehicle variants with near-real accuracy for testing on the at least one test bench.

The test apparatus includes a frame structure in the form of a functional model of the motor vehicle structure. For example, the frame structure includes a plurality of beam members, particularly extruded profiles. The beam members are preferably made from a metal alloy, particularly an aluminum alloy. In particular, the beam members can be connected and/or are connected to the frame structure.

The frame structure has a front frame section. Viewed directly from the side, the frame section is substantially rectangular, particularly rectangular, and/or substantially cuboid, particularly cuboid. The front frame section is preferably a functional model of a motor vehicle front end, particularly a functional model of a motor vehicle section in which the drive unit and/or transmission unit and the front axle of the motor vehicle are arranged.

The front frame section includes a front axle model that is in the form of a functional model of the front axle of the motor vehicle. The front axle model is in the form of a prototype of the front axle. In particular, the front axle model simulates the front axle of the motor vehicle in the test apparatus with near-real or even realistic accuracy.

The frame structure includes a rear frame section. Viewed directly from the side, the rear frame section has a substantially triangular, particularly a triangular shape, for example. The rear frame section is preferably in the form of a functional model of the rear end of a motor vehicle, particularly a functional model of a motor vehicle section in which the exhaust system and the rear axle of the motor vehicle are arranged.

The rear frame section includes a rear axle model that is in the form of a functional model of the rear axle of the motor vehicle. The rear axle model is in the form of a prototype of the rear axle. In particular, the rear axle model simulates the rear axle of the motor vehicle in the test apparatus with near-real or even realistic accuracy.

The frame structure includes a middle frame section. The middle frame section is substantially cuboid in shape, particularly cuboid in shape, for example. The middle frame section is arranged between the front frame section and the rear frame section. The middle frame section is particularly mounted centrally on the front frame section and/or the rear frame section, for example. In particular, the middle frame section is in the form of a functional model of a motor vehicle middle, specifically a functional model of a motor vehicle section, in which a passenger cabin and seats of the motor vehicle are arranged.

The frame structure is adjustable so that its length may be varied. The front frame section and/or the rear frame section is/are preferably movable, particularly slidable and/or displaceable relative to the middle frame section. In particular, the front frame section and/or the rear frame section can be pushed into the middle frame section and/or pulled out of the middle frame section. The front frame section and/or the rear frame section is/are supported so as to be slidable and/or displaceable in the middle frame section, for example, and they include at least one suitable bearing device, for this purpose.

It is advantageous that because the front frame section and/or the rear frame section is/are slidable relative to the middle frame section, a center distance between the front axle model and the rear axle model can be varied. In particular, the center distance of the frame structure is variably adjustable, which thus enables the frame structure to represent many different motor vehicle structures with different wheelbases.

In addition, it is optionally possible within the scope of the present disclosure that the middle frame section may also be movable, particularly slidable and/or displaceable relative to the front frame section and/or relative to the rear frame section. In particular, it is thus advantageously possible to configure a mass distribution, a center of gravity, particularly a center of mass and/or moments of inertia of the frame structure variably. In this way, the frame structure is able to represent many different mass distributions, centers of gravity and moments of inertia.

The middle frame section, the front frame section and/or the rear frame section preferably include at least one guidance device to ensure that the aforementioned frame sections are movable without jamming.

It is particularly preferable if a development-specific and/or project-specific stiffness setting of the motor vehicle structure can be made by appropriate use and/or substitution of the beam members, for example by use thereof in various material thicknesses. In particular, the beam members used to create the frame structure are selected and on the basis of their stiffness. This enables many motor vehicle structures to be simulated realistically in respect of their stiffness.

A preferred version of the present disclosure provides that the test apparatus includes at least one stiffening means. The at least one stiffening means includes for example at least two bending beams which can be and/or are braced against one another, and the bracing length of which is variably adjustable. For example, the at least one stiffening means may be mountable on the frame structure. It is further advantageous that the use of the at least one stiffening means enables the stiffness of the frame structure to be adjusted continuously, particularly during a development process of the motor vehicle. This is particularly useful because changes to the stiffness of the motor vehicle structure may occur during development of the vehicle as a result of changes to the motor vehicle design, for example, and these must be reflected in the test apparatus.

In a preferred construction variant of the present disclosure, the test apparatus includes a first, a second, a third and a fourth wheel structure model. Each of the wheel structure models is in the form of a functional model of a motor vehicle wheel. Preferably, a first and a second wheel structure model may be and/or are mounted on the front axle model, and a third and a fourth wheel structure model may be and/or are mounted on the rear axle model. It is also possible for the test apparatus to include shock absorber models for preferably each of the wheel structure models, which are in the form of functional models of the motor vehicle shock absorbers. The shock absorber models are prototypes or original parts, for example.

Preferably, the test apparatus may and/or is mounted over the wheel structure models arranged on the front axle model and the rear axle model, particularly via wheel hubs of the wheel structure models, for testing on the at least one test bench. For example, the test bench includes a plurality of hydraulic cylinders that are used to generate forces that normally act on the motor vehicle while it is being driven. In particular, information about structural loads on the motor vehicle under real load conditions may be gained from the test results.

In a preferred further development of the present disclosure, the test apparatus includes an exhaust system model, which is in the form of a functional model of the motor vehicle exhaust system. The exhaust system model is constructed as a prototype of the motor vehicle exhaust system, for example. It is also possible to use an original exhaust system of the motor vehicle as the exhaust system model. The middle frame section and the rear frame section preferably each have at least one fastening interface for the exhaust system model. In particular, the exhaust system model may be mounted on the middle frame section and on the rear frame section via the at least one fastening interface on each. The exhaust system model is particularly preferably positionable on the middle frame section and on the rear frame section in such manner that it reproduces the center of gravity, mass ratios and inertia moments of the motor vehicle exhaust system that is to be simulated in geometrically correct, and particularly realistic manner.

In a preferred embodiment of the present disclosure, the test apparatus includes a grounding block, which is in the form of a mass model of the motor vehicle drive and/or transmission unit. Optionally, the drive and/or transmission unit includes a drivetrain of the motor vehicle, which is also realized as a model in the test apparatus via the grounding block. The front frame section preferably has at least one mounting interface for the grounding block. The grounding block may preferably be mounted on the front frame section, and particularly fastened thereto, via the at least one mounting interface. The grounding block is particularly preferably positionable on the front frame section in such manner that that it reproduces the center of gravity, mass ratios and inertia moments of the drive and/or transmission unit that is to be simulated in geometrically correct, and particularly realistic manner.

In a preferred variant of the present disclosure, the test apparatus includes at least one mass balancing apparatus. The at least one mass balancing apparatus is preferably constructed to enable realistic simulation of the distribution of masses in the motor vehicle. For example, the at least one mass balancing apparatus includes at least one, preferably two or more weight components, which may be and/or are arranged in the test apparatus to correspond to a real distribution of masses in the motor vehicle. In this way, the test apparatus is able to realistically reproduce and/or simulate a large number of different motor vehicles in respect of center of gravity, mass distribution and inertia moments of the motor vehicle. In particular, a dynamic behavior of the motor vehicle may be reconstructed.

The weight components of the at least one mass balancing apparatus are constructed for example as at least two or more, for example four original front seats of the motor vehicle. The front seats are optionally mounted on base brackets, via which they may be mounted and/or attached to the middle frame section. In particular, the front seats are variably positionable in or on the middle frame section by means of the base brackets. The front seats are preferably adjustable in the lengthwise direction of the test apparatus and up and down, particularly to reflect a standard mechanical or optionally electrical seat functionality in the motor vehicle. Particularly preferably, the front seats are also slidable transversely to the lengthwise direction. In this way a realistic mass distribution of the motor vehicle can be reproduced by the test apparatus.

Optionally in addition thereto, further weight components of the at least one mass balancing apparatus may be realized in the form of dummies, particularly dummies that may be filled with a filler material, wherein such filler material may particularly be water. Preferably, one or more, or all of the dummies may be and/or are fixed individually to one of the front seats. This enables a mass distribution of the motor vehicle to be reproduced more flexibly in the test apparatus.

It is advantageous that with the capability of positioning the front seats variably in the middle frame section, a number of the dummies and/or by means of the quantity of filler material used, it is possible to variably adjust and reproduce the center of gravity, the mass distribution, the total mass and the inertia moments of the motor vehicle, particularly about a transverse, lengthwise and vertical axis of the motor vehicle. It is possible that the at least one mass balancing apparatus further includes at least one additional balancing weight, a steering wheel model for example. Alternatively, or optionally additionally thereto, the at least one additional balancing weight may be mounted variably on the frame structure.

A preferred variant of the present disclosure provides that the test apparatus includes at least one sensor system. The at least one sensor system is arranged for example on the frame structure, on the front axle model and/or on the rear axle model. The at least one sensor system is preferably designed to register forces acting on the test apparatus, particularly stresses and/or loads on the at least one test bench. Optionally in addition thereto, the test apparatus includes an evaluation unit that evaluates the registered forces.

It is particularly preferable that the frame structure is constructed on the basis of a virtual computer model of the motor vehicle structure. In particular, the frame structure is constructed on the basis of a CAD data of the motor vehicle structure. In this way, the frame structure can be adapted easily and precisely to the motor vehicle structure, thereby creating a realistic functional model of the motor vehicle structure.

The present disclosure further relates to a test bench with the test apparatus according to the preceding description. The test apparatus is particularly configured for testing on the test bench. The test bench is in the form of a measuring test bench or a load test bench for example.

The present disclosure also relates to a method for simulated testing of a motor vehicle on at least one test bench, particularly a test bench according to the preceding description. The method is carried out with a test apparatus, preferably with the test apparatus according. Within the scope of the method, a wheelbase, a center distance, a stiffness, at total mass, a center of gravity, a mass distribution and/or inertia moments of the test apparatus are set in such manner that they realistically correspond to a wheelbase, a center distance, a stiffness, at total mass, a center of gravity, a mass distribution and/or inertia moments of the motor vehicle.

Within the scope of the method, the at least one sensor system preferably registers forces that act on the test apparatus in the tested state, particularly during the simulated testing on the at least one test bench.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
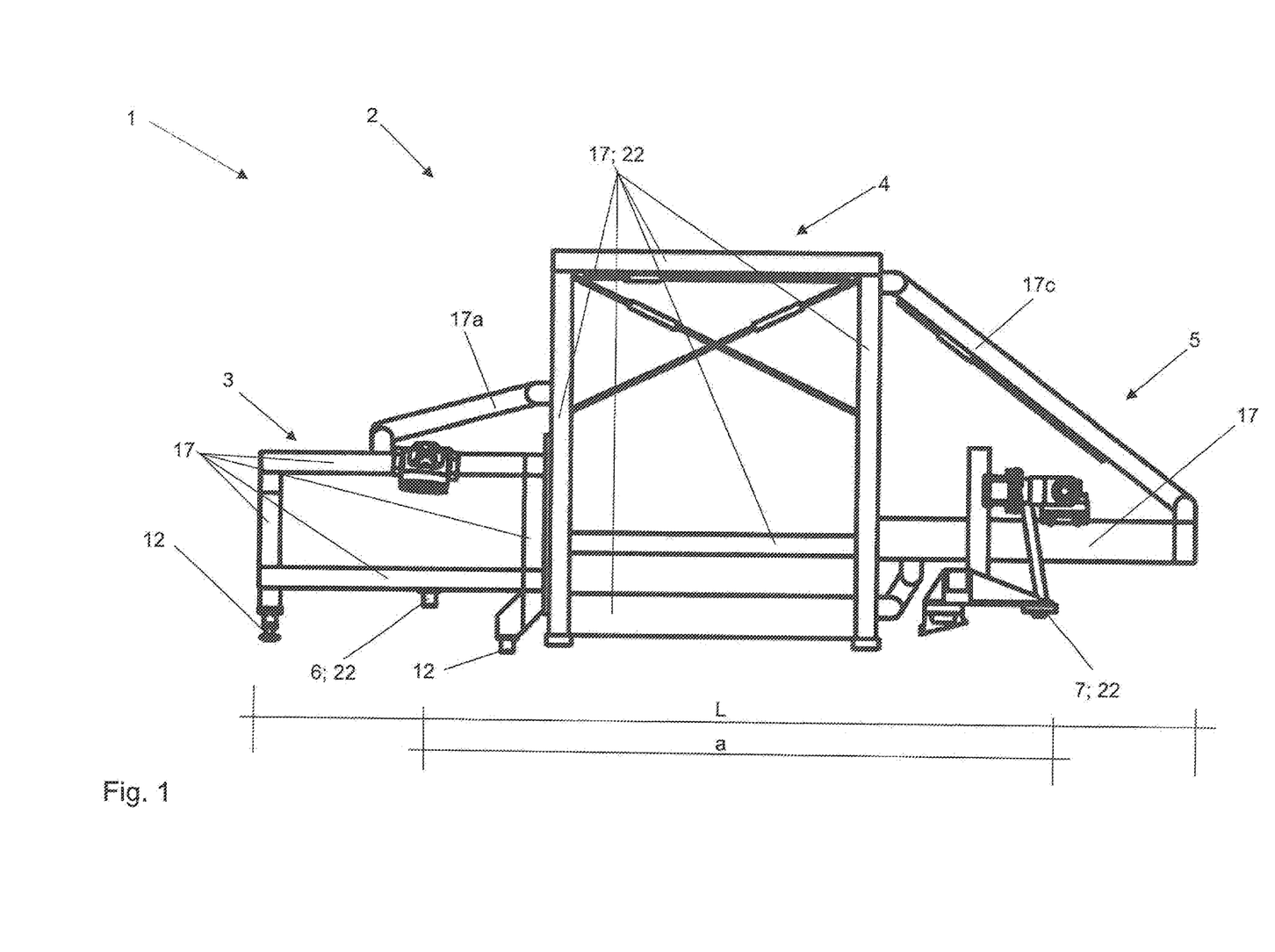
FIG. 1 is a direct side view of a test apparatus having a frame structure including a front frame section, a middle frame section and a rear frame section.
Figure 4:
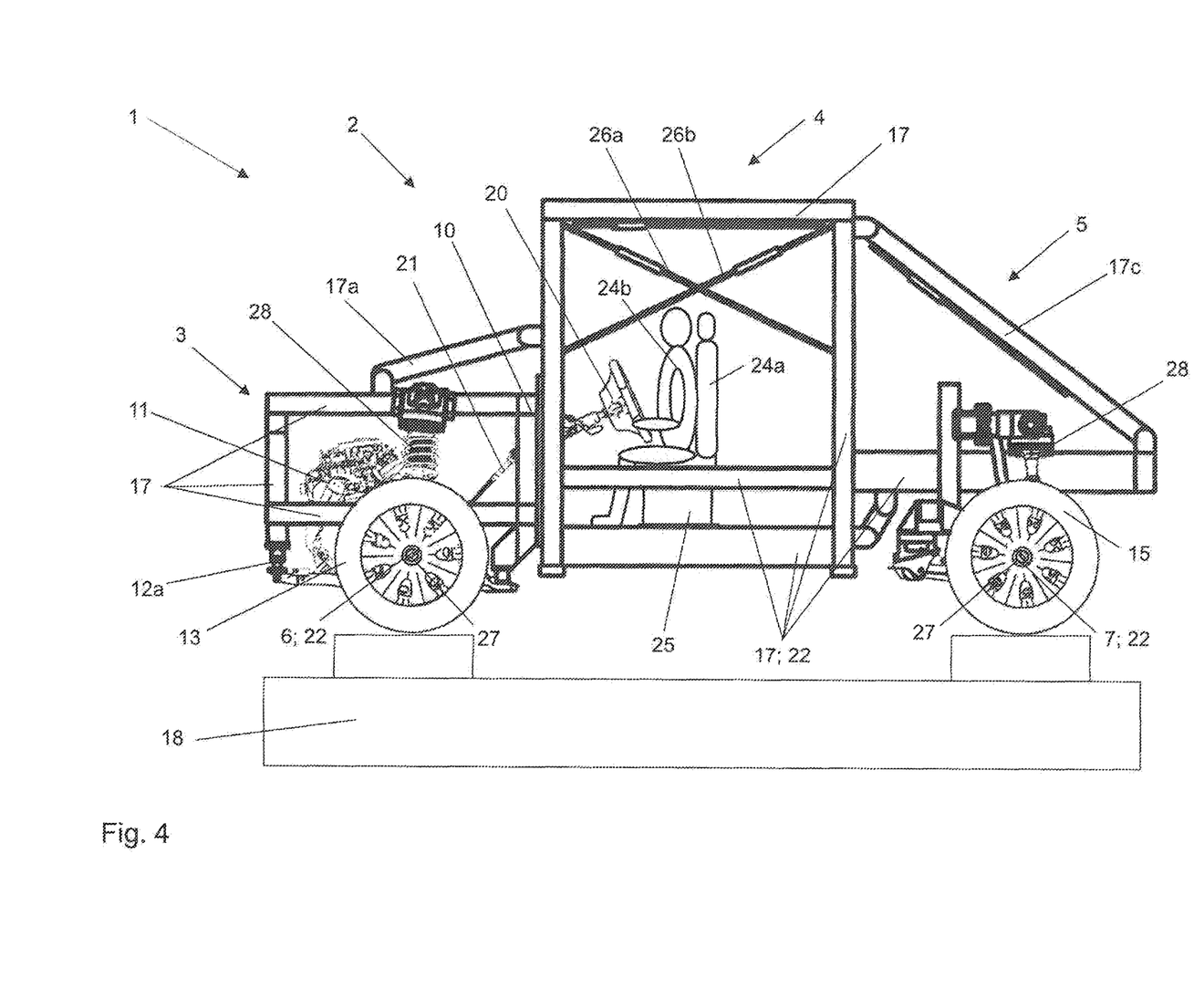
FIG. 4 is a diagrammatic representation of a test bench, wherein the test apparatus of FIG. 3 is arranged on the test bench for testing.

FIG. 1 shows a side view of a functional arrangement 1. Test apparatus 1 has the form of a functional model of the motor vehicle. Functional arrangement 1 is designed to perform a simulated test of a motor vehicle, particularly a motor car, on a test bench 18 (FIG. 4). The motor vehicle has a motor vehicle structure, a drivetrain, a front axle and a rear axle. It is based on a B type (subcompact) and/or C type (compact) motor vehicle segment.

Test apparatus 1 includes a frame structure 2, which is in the form of a functional model of the motor vehicle structure. Frame structure 2 is constructed on the basis of a virtual computer model of the motor vehicle structure. CAD data for example is used to produce the frame structure. In this way, the frame structure can be adapted precisely to a shape, size, and/or contour of the motor vehicle structure and reproduce it realistically.

Frame structure 2 includes a plurality of beam members 17, for example extruded profiles, which are made from a metal alloy, particularly an aluminum alloy. Beam members 17 are connected together to form frame structure 2. Frame structure 2, particularly individual or multiple beam members thereof, may be substituted and/or replaced to reproduce a stiffness of the motor vehicle structure that is specific to a given development and/or project. In particular, such beam members that have a stiffness matching the stiffness of the motor vehicle structure are used to create frame structure 2.

Frame structure 2 includes a front frame section 3, a middle frame section 4 and a rear frame section 5. Front frame section 3 and middle frame section 4 are of cuboid or substantially cuboid construction. Front frame section 3 preferably forms a functional model of a front end of the motor vehicle. The front end of the motor vehicle is designed to accommodate a drive and/or transmission unit and a front axle of the motor vehicle. It is possible that the drive and/or transmission unit includes a drivetrain of the motor vehicle. Front frame section 3 includes a front axle model 6, which is in the form of a functional model of the front axle of the motor vehicle. Front axle model 6 is a prototype of the front axle for example.

Middle frame section 4 is a functional model of a middle section of a motor vehicle. The motor vehicle middle section is designed to enclose a passenger cabin, and to accommodate a steering wheel and passenger seats in the passenger cabin, on which seats people may sit or dummies may be secured. Middle frame section 4 is further de-signed to accommodate an exhaust system model (not shown). Middle frame section 4 is arranged between front frame section 3 and rear frame section 5, particularly centrally between said frame sections 3, 5.

Viewed directly from the side, rear frame section 5 is triangular or substantially triangular in shape. It forms a functional model of a motor vehicle rear end, wherein the motor vehicle rear end is designed to accommodate an exhaust system and the rear axle of the motor vehicle. Rear frame section 5 includes a rear axle model 7. Rear axle model 7 has the form of a functional model of the rear axle of the motor vehicle. Rear axle model 7 may also be designed as a prototype of the rear axle of the motor vehicle.

Front frame section 3 has first coupling beam members 17a, 17b, and rear frame section 5 has second coupling beam members 17c, 17d, via which the front frame section 3 and rear frame section 5 are coupled with middle frame section 4 to create frame structure 2.

Length (L) of frame structure 2 may be set variably. For this purpose, front frame section 3 and/or rear frame section 5 is/are movable relative to middle frame section 4, and may particularly be slid into and/or out of middle frame section 4. At least one of the frame sections 3, 4, 5 may be equipped with at least one guidance device to guide the sliding movement of at least one of the frame sections 3, 5 relative to middle frame section 4. With the capability of altering the length of frame structure 2 and the relative movement of frame sections 3, 5, it is possible to variably adjust a center distance a between front axle model 6 and rear axle model 7. The advantage of this is that test apparatus 1 can be adapted realistically to many different motor vehicle structures with different wheelbases, so that they can be reproduced realistically.

Middle frame section 4 is movable, particularly slidable, relative to front frame section 3 and/or rear frame section 5. This makes it possible to adjust and variably configure a center of gravity, particularly a center of mass, mass ratios and inertia moments of frame structure 2. Thus, it is advantageously possible to realistically reproduce a center of gravity, particularly a center of mass, mass ratios and inertia moments of the motor vehicle with test apparatus 1.

Figure 2:
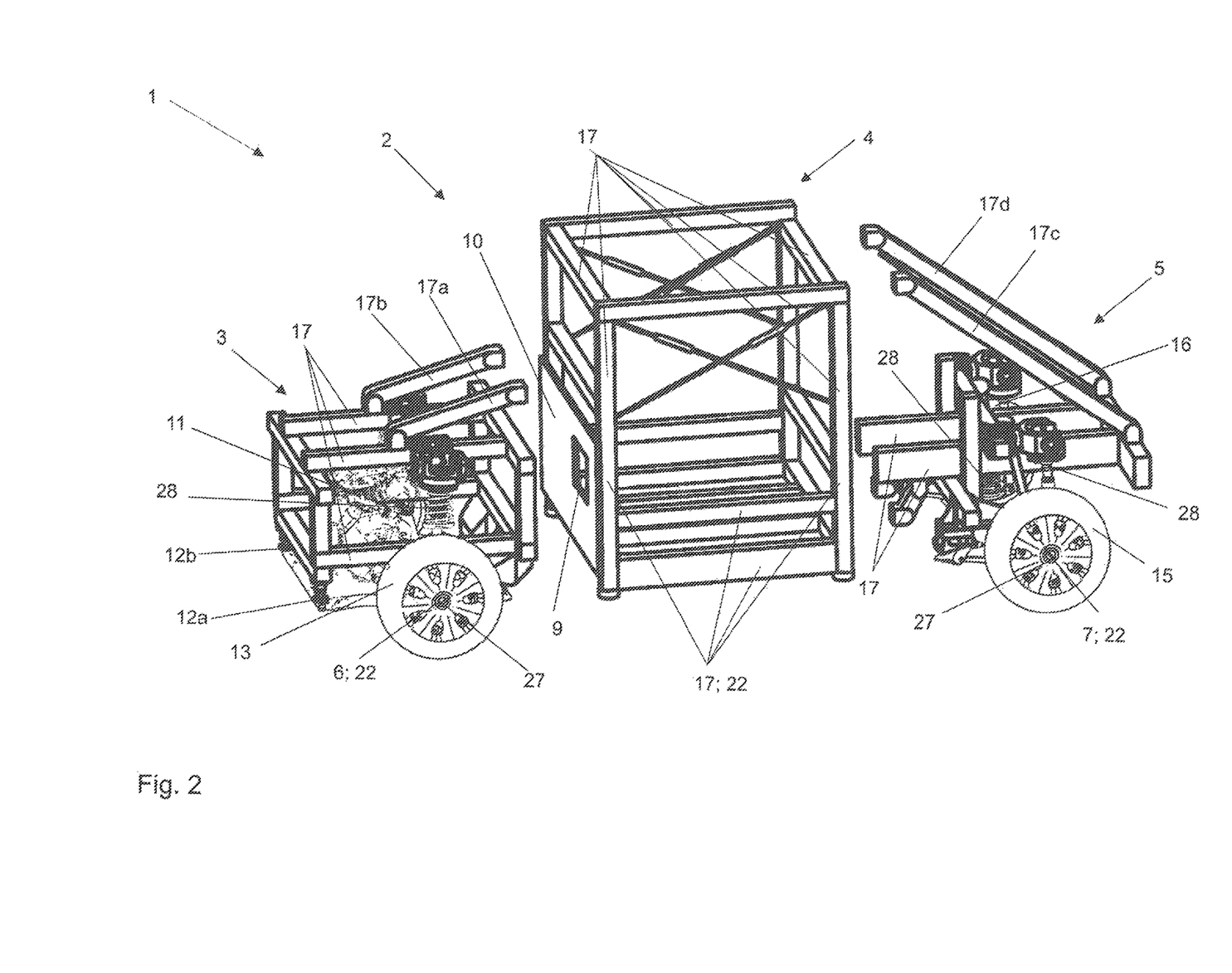
FIG. 2 is a perspective side view of the test apparatus of FIG. 1, wherein the front frame section, the middle frame section and the rear frame section are arranged separately from each other and include further functional models.

FIG. 2 shows a perspective side view of the test apparatus 1 of FIG. 1. The first and second coupling Beam members 17a, 17b, 17c, 17d are uncoupled from middle frame section 4, so that front frame section 3, middle frame section 4 and rear frame section 5 are arranged separately, particularly at a distance from each other. Front frame section 3 and rear frame section 5 are slid away from middle frame section 4 or detached therefrom.

Test apparatus 1 includes a grounding block 11, which is constructed as a mass model of the drive and/or transmission unit, including the motor vehicle drivetrain. In particular, grounding block 11 simulates the drive and/or transmission unit, including the motor vehicle drivetrain. Grounding block 11 is arranged in front frame section 3. Front frame section 3 includes at least one mounting interface 12, e.g., two mounting interfaces 12a, 12b, via which grounding block 11 via which is fastened to front frame section 3. Grounding block 11 may be positioned in front frame section 3 in such manner that it reproduces the center of gravity, mass ratios and/or inertia moments of the drive and/or transmission unit realistically and geometrically accurately.

Test apparatus 1 has a first, a second, a third and a fourth wheel structure model 13, 14, 15, 16, wherein the first and second wheel structure models 13, 14 are arranged on front axle model 6, and the third and fourth wheel structure models 15, 16 are arranged on rear axle model 7. Each of the wheel structure models 13, 14, 15, 16 is in the form of a functional model of a motor vehicle wheel. Optionally additionally thereto, each of the wheel structure models 13, 14, 15, 16 includes a wheel hub 27 and a shock absorber 28, via which they are connected to the corresponding axle model 6, 7, either front frame section 3 or rear frame section 5. Wheel structure models 13, 14, 15, 16 are in the form of prototypes. However, wheel structure models 13, 14, 15, 16 may also be original parts of the motor vehicle.

Frame structure 2 is mountable on test bench 18 via the respective wheel hubs 27 of the wheel structure models 13, 14, 15, 16, so that test apparatus 1 may be tested thereon. The at least one test bench 18 may be a load test bench, for example. On the load test bench, a large number of hydraulic cylinders are used to create simulation forces that recreate the forces which act on the motor vehicle when it is being driven due to road structures and unevennesses. The test results obtained therefrom, about structural loads of test apparatus 1 on the test bench for example, can be transferred to the motor vehicle under real load conditions. Alternatively or optionally in addition, the at least one test bench 18 may be a measurement test bench, on which the full range of the motor vehicle kinematics may be and/or is measured.

Test apparatus 1 includes an exhaust system model, which has the form of a functional model of the motor vehicle exhaust system. It is possible that the exhaust system model may be a prototype of the motor vehicle exhaust system. Middle frame section 4 and rear frame section 5 have at least one fastening interface for the exhaust system model via which it may be and/or is arranged on middle frame section 4 and rear frame section 5. In this way, the exhaust system model may be positioned geometrically correctly on middle frame section 4 and rear frame section 5, and realistically reproduce the center of gravity, mass ratios and/or inertia moments of the exhaust system.

Figure 3:
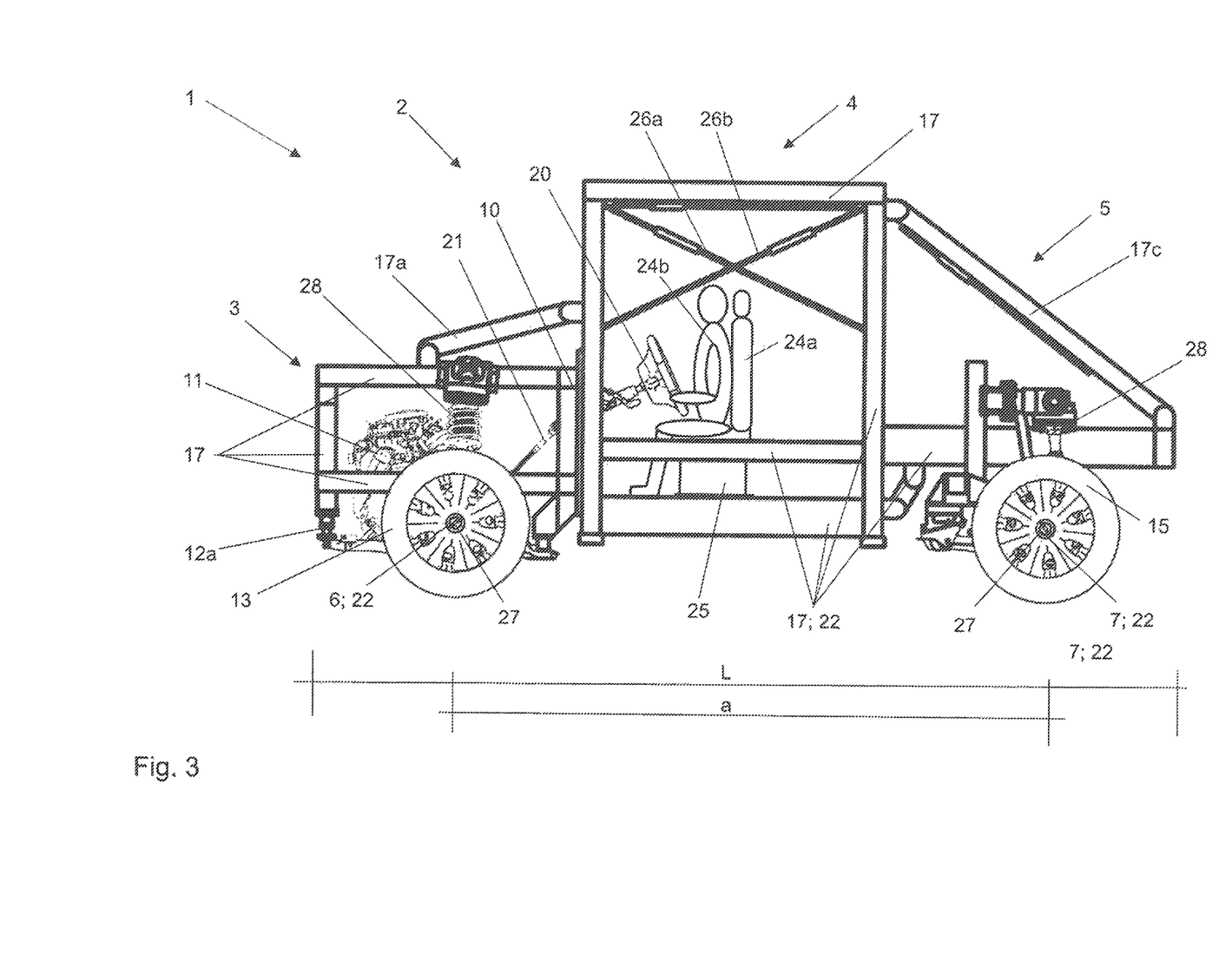
FIG. 3 is a direct side view of functional arrangement of FIG. 2, wherein the front frame section, the middle frame section and the rear frame section are connected to each other.

FIG. 3 shows a direct side view of test apparatus. The front frame section 3, middle frame section 4 and rear frame section 5 are coupled to each other via coupling beam members 17a, 17b, 17c, 17d.

Test apparatus 1 includes a steering wheel model 20 in the form of a functional model of the motor vehicle steering wheel. Steering wheel model 20 is connected to the drivetrain of grounding block 11 via a steering rack 21. Steering wheel model 20 may be a prototype or an original part of the motor vehicle. It is arranged in middle frame section 4 and may also be used to reproduce the center of gravity, the mass ratios and/or the inertia moments of the motor vehicle.

Test apparatus 1 includes at least one mass balancing apparatus 24 with at least one, preferably at least two weight components 24a, 24b. The at least one mass balancing apparatus 24 is designed to realistically simulate the mass distribution of the motor vehicle in test apparatus 1. In this way, test apparatus 1 may be used to recreate or simulate a wide variety of motor vehicles, particularly in terms of their center of gravity, mass distribution and inertia moments. Consequently, an overall dynamic behavior of the motor vehicle may be reconstructed.

At least one of the weight components 24a, 24b is in the form of a front seat, for example four original front seats from the motor vehicle. FIG. 3 shows an example of a first front seat 24a. Said seat is arranged in middle frame section 4 and is flexibly positionable there. For this purpose, it is equipped with a base bracket 25, via which it is connected to middle frame section 4. Front seat 24a is displaceable inside middle frame section 4 in a lengthwise direction of test apparatus 1 as well as vertically up and down. Particularly preferably, front seat 24a is also displaceable transversely to the lengthwise direction, with the effect that the center of gravity, mass distribution and/or inertia moments in the middle of the motor vehicle may be reproduced flexibly by middle frame section 4.

A second weight component 24b is shown in FIG. 3 for exemplary purposes as a dummy that may be filled with a filler material. The filler material may particularly be a liquid, for example water. The dummy is arranged and/or may be mounted on front seat 24a. Since it is possible to vary the number, positioning and fill volume of the dummies, the center of gravity, mass distribution and/or inertia moments of the motor vehicle may be simulated realistically by test apparatus 1.

Test apparatus 1 includes a stiffening means 26. Stiffening means 26 includes, at least two bending beams 26a, 26b, which may be and/or are braced against each other. A bracing length of the two bending beams 26a, 26b is adjustable, so the stiffness of frame structure 2 can be adjusted realistically to the motor vehicle stiffness. Stiffening means 26 may be and/or is fastened to frame structure 2 of test apparatus 1. It provides the advantage that it is still possible to make adjustments to the stiffness after frame structure 2 has been assembled in a project-specific configuration from beam members 17. In particular, stiffness adjustments that are necessitated by changes to the design of the motor vehicle can be transferred to frame structure 2 during development of the motor vehicle.

Test apparatus 1 includes at least one sensor system 22. The at least one sensor system 22 is arranged on frame structure 2, front axle model 6 and/or on rear axle model 7. The at least one sensor system 22 registers the forces on load test bench 18 that are transferred to test apparatus 1, and in this way detects stresses and/or loads. Test apparatus 1 further includes an evaluation unit, which is designed to evaluate the forces captured by the at least one sensor system 22.

FIG. 4 is a diagrammatic representation of the at least one test bench 18 with test apparatus 1. Test apparatus 1 is particularly arranged for carrying out load tests and/or measurements on test bench 18. Test bench 18 is in the form of a measuring test bench for measuring the motor vehicle and/or as a load test bench for testing structural loads on the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A test apparatus for simulated testing of a motor vehicle on at least one test bench, the test apparatus comprising:
a frame structure having a plurality of beam members that cooperate to form a model of a body of the motor vehicle, the frame structure having a length and including:
a front frame section with a front axle model, the front frame section having a first coupling beam member;
a rear frame section with a rear axle model, the rear frame section having a second coupling beam member; and
a middle frame section arranged between the front frame section and the rear frame section, the middle frame section defined by a subplurality of beam members of the plurality of beam members, with the subplurality of beam members including a first beam member opposed from a second beam member, the first beam member coupled to the first coupling beam member and the second beam member coupled to the second coupling beam member; and
at least one stiffening element including at least two bending beams that are coupled to one another, the at least two bending beams coupled to the first beam member and the second beam member so as to extend between the first beam member and the second beam member of the middle frame section, the at least one stiffening element defining a bracing length that is adjustable relative to the middle frame section to vary a stiffness of the frame structure,
wherein the front frame section and the rear frame section are each movable relative to the middle frame section such that the length of the frame structure structure is variably adjustable.

2. The test apparatus according to claim 1, wherein the middle frame section is movable relative to at least one of the front frame section and the rear frame section.

3. The test apparatus according to claim 1, wherein the rear frame section is triangular in shape and the front frame section and the middle frame section is cuboid in shape in a direct side view.

4. The test apparatus according to claim 1, further comprising a plurality of wheel structure models, wherein each wheel structure model includes a model of a wheel, wherein a first wheel structure model is arranged on the front axle model, and a second wheel structure model is arranged on the rear axle model.

5. The test apparatus according to claim 1, further comprising an exhaust system model and at least one fastening interface attaching the exhaust system model to at least one of the middle frame section and the rear frame section.

6. The test apparatus according to claim 1, further comprising a grounding block having a mass model of the drivetrain and at least one mounting interface attaching the grounding block to the front frame section.

7. The test apparatus according to claim 1, further comprising a mass balancing apparatus having at least one weight component variably positionable on the frame structure, wherein the mass balancing apparatus is configured to simulate at least one of an inertia moment, a mass distribution or a center of gravity of the motor vehicle.

8. The test apparatus according to claim 7, wherein the at least one weight component comprises at least one front seat and a dummy, wherein the at least one dummy is mounted on the at least one front seat.

9. The test apparatus according to claim 1, further comprising at least one sensor system configured to register forces acting on at least the frame structure in a testing condition on a test bench.

10. The test apparatus according to claim 1, wherein the frame structure is constructed based on a computer model of the motor vehicle structure.

11. The test apparatus according to claim 1, wherein the test apparatus is mounted on a test bench.

12. A method for simulated testing of a motor vehicle on at least one test bench with a test apparatus according to claim 1, the method comprising:
- adjusting at least one of a wheelbase, a center distance, a center of gravity, a mass distribution or an inertia moment of the test apparatus by adjusting a length of the frame structure to correspond with the motor vehicle;
- adjusting a stiffness of the frame structure to correspond to the motor vehicle by adjusting the bracing length of the at least one stiffening element;
- mounting the test apparatus on the at least one test bench; and
- testing the test apparatus on the at least one test bench.

13. The method according to claim 12, further comprising registering forces acting on at least the frame structure during the testing on the test bench with at least one sensor system arranged on the frame structure.

14. A test apparatus for simulated testing of a motor vehicle on at least one test bench, the test apparatus comprising:
- a frame structure having a plurality of beam members that cooperate to form a model of a body of the motor vehicle, the frame structure having a length and including:
  - a front frame section with a front axle model, the front frame section having a first coupling beam member;
  - a rear frame section with a rear axle model, the rear frame section having a second coupling beam member; and
  - a middle frame section arranged between the front frame section and the rear frame section, the middle frame section defined by a subplurality of beam members of the plurality of beam members, with the subplurality of beam members including a first beam member opposed from a second beam member and a third beam member opposed from a fourth beam member, the third beam member interconnecting the first beam member and the second beam member at a first end, and the fourth beam member interconnecting the first beam member and the second beam member at a second end, the second end opposite the first end, the first beam member coupled to the first coupling beam member and the second beam member coupled to the second coupling beam member; and
- at least one stiffening element including at least two bending beams that are coupled to one another, the at least two bending beams each having a first bending beam end coupled to a respective one of the first beam member and the second beam member proximate the third beam member and a second bending beam end coupled to a respective one of the first beam member and the second beam member so as to be spaced a distance apart from the fourth beam member, the at least two bending beams extend between the first beam member and the second beam member, the at least one stiffening element defining a bracing length that is adjustable relative to the middle frame section to vary a stiffness of the frame structure,
- wherein the front frame section and the rear frame section are each movable relative to the middle frame section such that the length of the frame structure is variably adjustable.

* * * * *